UNITED STATES PATENT OFFICE.

ARTHUR WEINBERG, OF FRANKFORT-ON-THE-MAIN, GERMANY, ASSIGNOR TO LEOPOLD CASSELLA & CO., OF SAME PLACE.

VIOLET DYE.

SPECIFICATION forming part of Letters Patent No. 464,538, dated December 8, 1891.

Application filed May 16, 1891. Serial No. 393,019. (Specimens.)

*To all whom it may concern:*

Be it known that I, ARTHUR WEINBERG, doctor of philosophy, a citizen of the Empire of Germany, and a resident of Frankfort-on-the-Main, have invented certain new and useful Improvements in the Production of New Acid Violet Dye-Stuffs, of which the following is a specification.

This invention relates to the production of new acid violets belonging to the triphenylmethane group by a new method, which consists in the simultaneous oxidation of derivatives of diamidodiphenylmethane and aromatic monamines in aqueous or alcoholic solution.

In carrying out this invention I proceed as follows:

*First example:* Fifty-eight kilos of methyl or ethyl benzylaniline sulphonic acid are heated in a water bath with the concentrated aqueous solution of three kilos formic aldehyde. After twenty-four hours the reaction is terminated. On cooling, the dimethyl (ethyl) dibenzyldiphenylmethane disulphonic acid separates from the solution. Sixty kilos of this acid are dissolved in two thousand liters of water, twelve kilos dimethylaniline, (or fifteen kilos diethylaniline,) and then twenty kilos bichromate of potash are added, then heated for twenty-four hours at a temperature of 40° to 50° centigrade. The chromhydrate is separated by filtration, and from the violet solution the disulphonate of the tetramethyl (ethyl) dibenzyltriamidotriphenylcarbinol is precipitated by common salt. The reaction corresponds to the formula:

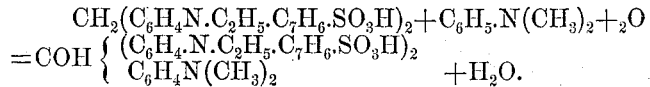

*Second example:* Twenty-nine kilos of ethylbenzylaniline sulphonic acid are dissolved in sixty kilos of sulphonic acid containing fifty per cent. $H_2SO_4$. To this solution twelve kilos of dimethylaniline and then three kilos of formic aldehyde in concentrated aqueous solution are added, and then heated thirty-six hours to about 80° centigrade and diluted with water. The dimethylethylbenzyldiamidodiphenylmethane monosulpho-acid, which is difficultly soluble in cold water, separates entirely. Fifty kilos of this acid are dissolved in five thousand liters of water of 50° centigrade, together with thirty kilos benzylethylaniline sulpho-acid. It is oxidized with twenty kilos of bichromate of potash and heated twenty-four hours to 50° to 60° centigrade. The thus-obtained violet color is identical with that of the first example. It is formed according to the formula:

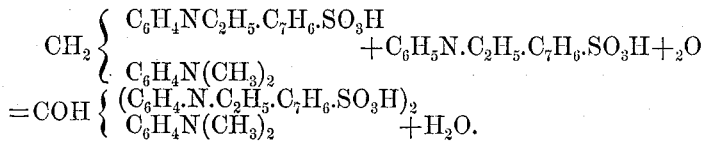

In these examples ethylbenzylaniline sulpho-acid and dimethylaniline can be substituted by methylbenzylaniline sulpho-acid and diethylaniline.

Instead of chromic acid other oxidizing agents—such as peroxides—can be used.

What I claim as new, and desire to secure by Letters Patent, is—

1. The process of producing dye-stuffs, consisting in the following steps: solutions of the substituted diamidodiphenylmethanes are mixed with solutions of aromatic monamines, and oxidizing substances are added to the mixture, substantially as described.

2. The violet coloring-matter teralkyldisulphobenzyldiamidotriphenylcarbinol, which forms a bronze-like powder easily soluble in water with a violet color, which is not changed by dilute alkali, less soluble in alcohol, and insoluble in ether, and in strong sulphuric acid dissolves with a yellow-orange shade, and if this solution is diluted the free acid of the dye-stuffs remains dissolved with a green shade.

In testimony that I claim the foregoing as my invention I have signed my name, in presence of two witnesses, this 2d day of May, 1891.

ARTHUR WEINBERG.

Witnesses:
ALVESTO S. HOGUE,
JEAN GRUND.